US012561143B2

(12) United States Patent
Ezrielev et al.

(10) Patent No.: US 12,561,143 B2
(45) Date of Patent: Feb. 24, 2026

(54) SYSTEM AND METHOD FOR REMEDIATING MISALIGNMENT OF A DATA PIPELINE

(71) Applicant: Dell Products L.P., Round Rock, TX (US)

(72) Inventors: Ofir Ezrielev, Beer Sheva (IL); Hanna Yehuda, Acton, MA (US); Inga Sogaard, Wichita, KS (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 18/343,981

(22) Filed: Jun. 29, 2023

(65) Prior Publication Data

US 2025/0004774 A1 Jan. 2, 2025

(51) Int. Cl.
| | |
|---|---|
| *G06F 9/30* | (2018.01) |
| *G06F 9/38* | (2018.01) |
| *G06F 9/50* | (2006.01) |
| *G06F 9/54* | (2006.01) |
| *G06F 11/10* | (2006.01) |
| *G06F 11/1474* | (2026.01) |

(52) U.S. Cl.
CPC .......... *G06F 9/3816* (2013.01); *G06F 9/3858* (2023.08); *G06F 9/541* (2013.01); *G06F 11/1474* (2013.01)

(58) Field of Classification Search
CPC .............................. G06F 11/1474; G06F 11/14
See application file for complete search history.

(56) References Cited

U.S. PATENT DOCUMENTS

| | | |
|---|---|---|
| 7,315,805 B2 | 1/2008 | Slater |
| 7,788,470 B1 | 8/2010 | Purcell |
| 9,990,383 B2 | 6/2018 | Brinnand |
| 10,168,691 B2 | 1/2019 | Zornio et al. |
| 10,936,479 B2 | 3/2021 | Maag et al. |
| 11,101,037 B2 | 8/2021 | Allen |
| 11,221,270 B2 | 1/2022 | Evans |
| 11,281,453 B1 | 3/2022 | Ramachandran |
| 11,314,517 B2 | 4/2022 | Keski-Valkama |
| 11,341,605 B1 | 5/2022 | Singh |

(Continued)

OTHER PUBLICATIONS

Wang, Haozhe, et al., "A graph neural network-based digital twin for network slicing management," IEEE Transactions on Industrial Informatics 18.2 (2020): 1367-1376 (11 Pages).

(Continued)

*Primary Examiner* — Philip Guyton
*Assistant Examiner* — Sean Kevin Mcnamara
(74) *Attorney, Agent, or Firm* — WOMBLE BOND DICKINSON (US) LLP

(57) ABSTRACT

Methods and systems for managing operation of a data pipeline are disclosed. To manage the data pipeline, a system may include one or more data sources, a data repository, and one or more downstream consumers. Data obtained from a data source external to the system may have unexpected characteristics that may cause misalignment of one or more application programming interfaces used by the data pipeline. To remediate the misalignment and reduce occurrences of future misalignments, the data may be classified based on a type of error in the data and an action set may be performed based on the classification.

20 Claims, 8 Drawing Sheets

(56) References Cited

U.S. PATENT DOCUMENTS

| | | | |
|---|---|---|---|
| 11,853,853 B1 | 12/2023 | Beauchesne et al. | |
| 12,008,046 B1 | 6/2024 | Curtis et al. | |
| 12,019,902 B2 | 6/2024 | Haile | |
| 12,182,098 B1 | 12/2024 | Ezrielev | |
| 12,216,651 B2 | 2/2025 | Krishnan | |
| 12,242,447 B2 | 3/2025 | Ezrielev | |
| 12,242,543 B1 | 3/2025 | Pai | |
| 12,242,892 B1 | 3/2025 | Burnett | |
| 2004/0064750 A1 | 4/2004 | Conway | |
| 2006/0009881 A1 | 1/2006 | Ferber et al. | |
| 2013/0205285 A1 | 8/2013 | Pizlo | |
| 2013/0227573 A1 | 8/2013 | Morsi | |
| 2014/0037161 A1 | 2/2014 | Rucker | |
| 2014/0136184 A1 | 5/2014 | Hatsek | |
| 2016/0098037 A1 | 4/2016 | Zornio | |
| 2016/0179063 A1 | 6/2016 | De Baynast De Septfontaines | |
| 2017/0255460 A1 | 9/2017 | Frank | |
| 2017/0262298 A1 | 9/2017 | Frank | |
| 2018/0052708 A1 | 2/2018 | Ganesan | |
| 2018/0081871 A1 | 3/2018 | Williams | |
| 2019/0034430 A1 | 1/2019 | Das | |
| 2019/0236204 A1 | 8/2019 | Canim | |
| 2019/0251479 A1 | 8/2019 | Anderson et al. | |
| 2019/0361697 A1 | 11/2019 | Hu | |
| 2019/0370263 A1 | 12/2019 | Nucci | |
| 2020/0166558 A1 | 5/2020 | Weis | |
| 2020/0167224 A1 | 5/2020 | Abali | |
| 2020/0202478 A1 | 6/2020 | Thumpudi et al. | |
| 2020/0293684 A1* | 9/2020 | Harris | H04W 12/02 |
| 2020/0344325 A1 | 10/2020 | Sarisky | |
| 2020/0356428 A1 | 11/2020 | Rama | |
| 2020/0394044 A1 | 12/2020 | Keski-Valkama | |
| 2021/0027771 A1 | 1/2021 | Hall | |
| 2021/0081836 A1 | 3/2021 | Polleri | |
| 2021/0116505 A1 | 4/2021 | Shu | |
| 2021/0117548 A1 | 4/2021 | Gokhman | |
| 2021/0117859 A1 | 4/2021 | Rogers | |
| 2021/0248165 A1 | 8/2021 | Fry | |
| 2021/0374143 A1* | 12/2021 | Neill | G06F 16/24568 |
| 2021/0377286 A1 | 12/2021 | Shukla et al. | |
| 2021/0385196 A1 | 12/2021 | Rahmat | |
| 2021/0406110 A1 | 12/2021 | Vaid et al. | |
| 2022/0014584 A1 | 1/2022 | Huetter | |
| 2022/0086175 A1 | 3/2022 | Bharrat | |
| 2022/0092234 A1 | 3/2022 | Karri | |
| 2022/0301027 A1* | 9/2022 | Basta | G06Q 30/0601 |
| 2022/0310276 A1 | 9/2022 | Wilkinson | |
| 2022/0374399 A1 | 11/2022 | Kementsietsidis | |
| 2023/0014438 A1 | 1/2023 | Jones | |
| 2023/0040834 A1 | 2/2023 | Haile | |
| 2023/0081880 A1 | 3/2023 | Mathur | |
| 2023/0090398 A1 | 3/2023 | Upadhyay | |
| 2023/0126260 A1 | 4/2023 | Elsakhawy et al. | |
| 2023/0153095 A1 | 5/2023 | Rahill-Marier | |
| 2023/0196096 A1 | 6/2023 | Milne | |
| 2023/0213930 A1 | 7/2023 | Rakshit | |
| 2023/0315078 A1 | 10/2023 | Sepulveda et al. | |
| 2023/0342281 A1 | 10/2023 | Haile | |
| 2023/0418280 A1 | 12/2023 | Emery | |
| 2024/0119364 A1 | 4/2024 | Jain | |
| 2024/0126888 A1 | 4/2024 | Kalou et al. | |
| 2024/0235952 A9 | 7/2024 | Hicks | |
| 2024/0281419 A1* | 8/2024 | Alfaras | G06F 16/215 |
| 2024/0281522 A1 | 8/2024 | Kuo | |
| 2024/0330136 A1 | 10/2024 | Furlong | |
| 2024/0412104 A1 | 12/2024 | Zhang | |

OTHER PUBLICATIONS

Almasan, Paul, et al., "Digital Twin Network: Opportunities and challenges," arXiv preprint arXiv:2201.01144 (2022) (7 Pages).

Hu, Weifei, et al., "Digital twin: A state-of-the-art review of its enabling technologies, applications and challenges," Journal of Intelligent Manufacturing and Special Equipment 2.1 (2021): 1-34 (34 Pages).

Khan, Latif U., et al., "Digital-Twin-Enabled 6G: Vision, Architectural Trends, and Future Directions," IEEE Communications Magazine 60.1 (2022): 74-80 (7 Pages).

Nguyen, Huan X., et al., "Digital Twin for 5G and Beyond," IEEE Communications Magazine 59.2 (2021): 10-15. (12 Pages).

Wang, Danshi, et al., "The Role of Digital Twin in Optical Communication: Fault Management, Hardware Configuration, and Transmission Simulation," IEEE Communications Magazine 59.1 (2021): 133-139 (6 Pages).

Pang, Toh Yen, et al., "Developing a digital twin and digital thread framework for an 'Industry 4.0' Shipyard," Applied Sciences 11.3 (2021): 1097 (22 Pages).

Isto, Pekka, et al., "5G based machine remote operation development utilizing digital twin," Open Engineering 10.1 (2020): 265-272 (8 Pages).

Redick, William, "What is Outcome-Based Selling?" Global Performance, Web Page <https://globalperformancegroup.com/what-is-outcome-based-selling/> accessed on Feb. 14, 2023 (8 Pages).

"The Best Data Curation Tools for Computer Vision in 2022," Web Page <https://www.lightly.ai/post/data-curation-tools-2022> accessed on Feb. 14, 2023 (9 Pages).

Bebee, Troy et al., "How to detect machine-learned anomalies in real-time foreign exchange data," Google Cloud, Jun. 10, 2021, Web Page <https://cloud.google.com/blog/topics/financial-services/detect-anomalies-in-real-time-forex-data-with-ml> accessed on Feb. 14, 2023 (16 Pages).

Wang, Haozhe, et al., "A graph neural network-based digital twin for network slicing management," IEEE Transactions on Industrial Informatics 18.2 (2020): 1367-1376 (10 Pages).

Bosch et al., "Towards Automated Detection of Data Pipeline Faults", 2020 27th Asia-Pacific Software Engineering Conference (APSEC). IEEE, pp. 346-355 (Year: 2020).

Grafberger et al., "Towards Interactively Improving ML Data Preparation Code via Shadow Pipelines", DEEM '24: Proceedings of the Eighth Workshop on Data Management for End-to-End Machine Learning, published on Jun. 9, 2024, retrieved from <https://doi.org/10.1145/3650203.3663327> on Aug. 11, 2025 (5 pages).

* cited by examiner

Expected Data 400

Obtained Data 402

Updated Data 404

Discarded Parameter 406

Data Pipeline 408

SYSTEM AND METHOD FOR REMEDIATING MISALIGNMENT OF A DATA PIPELINE

FIELD

Embodiments disclosed herein relate generally to data management. More particularly, embodiments disclosed herein relate to systems and methods to manage data using data pipelines.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
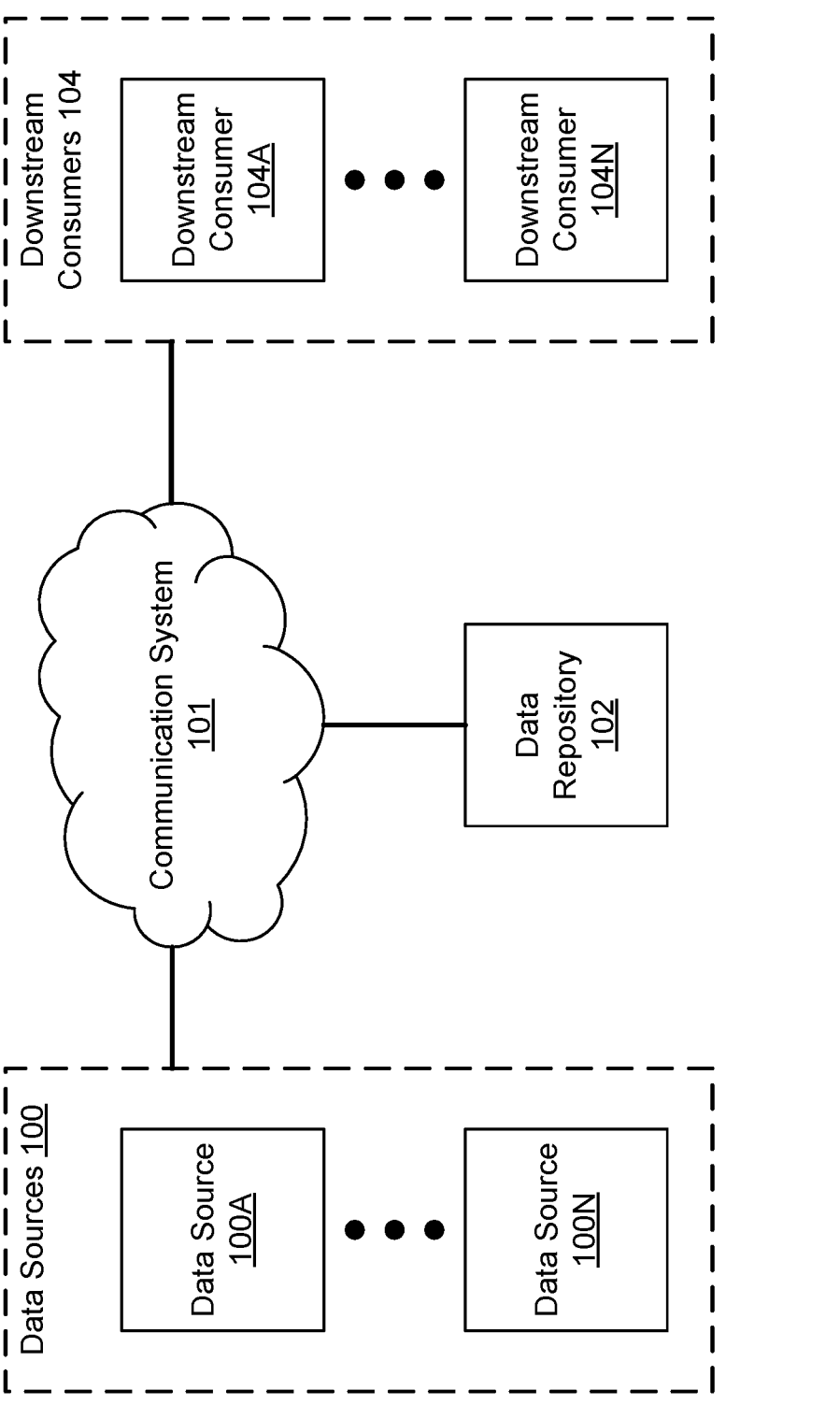
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data pipelines. Data usable by a data pipeline may be obtained from any number of data sources. Application programming interfaces (APIs) used by the data pipeline may be configured to consume data with certain characteristics (e.g., a certain number of parameters, a certain ordering of the parameters, etc.). Data obtained and fed into the data pipeline via an API that does not meet these characteristics may cause misalignment (e.g., non-nominal operation) of one or more APIs used by the data pipeline. Misalignment of the one or more APIs may result in no response from an API, a response in an unexpected or otherwise unusable format, and/or other errors. Therefore, a result of a call (e.g., a request for data) to an API may result in a failure to provide a response to downstream consumers of the data and a subsequent interruption to computer-implemented services provided by the downstream consumers.

If data that causes misalignment of an API is obtained from data sources internal to the system, updates may be made to the data pipeline (e.g., changes to code and/or to data schemes associated with the data pipeline) to modify the characteristics of the obtained data. Therefore, data stored by a data pipeline (e.g., in a data repository of the data pipeline), may have characteristics that will not cause misalignment of one or more APIs. However, if the data is obtained from one or more sources external to the system, characteristics of incoming data may not be modified and/or accurately predicted over time. Therefore, the incoming data from external sources may cause misalignment of one or more APIs used by the data pipeline.

To remediate misalignment of the one or more APIs, the system may monitor characteristics of data from external sources and may classify the data according to a type of error associated with the data. To do so, the system may identify a set of characteristics of the data and compare the set of the characteristics to a set of expected characteristics for the data. The set of the expected characteristics for the data may include characteristics of data that will not cause misalignment of the data pipeline when met. The characteristics may include, for example, a number of parameters, an ordering of parameters, etc.

Following identification of a type of error, the system may determine a remedial action set in response to the type of the error. To implement the remedial action set, the system may modify the data following obtaining the data, may re-issue a call for the data from one or more of the external data sources and may perform one or more transformations to the incoming data prior to feeding the data into an API of the data pipeline, and/or may take other actions based on the type of the error discovered in the data.

By doing so, the system may respond efficiently to misalignment of one or more APIs used by the data pipeline and may perform remedial actions in response to changes to incoming data from external data sources. Consequently, future incidents of misalignment of the data pipeline may be reduced (and/or swiftly remediated) and the data pipeline may more reliably provide computer-implemented services to downstream consumers based on data used by the data pipeline.

In an embodiment, a method of managing a data pipeline is provided. The method may include: obtaining data from one or more data sources associated with the data pipeline; making a determination regarding whether the data meets previously determined criteria for the data, the criteria indicating that an application programming interface used by the data pipeline is misaligned when met; in an instance of the determination in which the data meets the previously determined criteria for the data: initiating an error classification process using the data and a schema for identifying types of errors to obtain an error classification for the data; making an identification of an action set intended to remediate a type of error indicated by the error classification for the data; and in response to the identification, initiating performance of the action set to remediate the misalignment.

Initiating the error classification process may include: obtaining a first set of characteristics associated with the data; and comparing the first set of the characteristics associated with the data to a second set of the characteristics indicated by the schema for identifying types of errors to obtain an error classification for the data, the second set of the characteristics comprising characteristics that when met ensure alignment of the data pipeline.

The error classification may include one selected from a list consisting of: a first error classification, the first error classification indicating that the data comprises at least one extra parameter; a second error classification, the second error classification indicating that the data lacks at least one expected parameter; a third error classification, the third error classification indicating a change in a system of representation of information conveyed by the data; and a fourth error classification, the fourth error classification indicating a re-ordering of fields of responses from the application programming interface.

The action set may include: in an instance where the error classification is the first error classification: identifying the extra parameter; discarding the extra parameter from the data pipeline to obtain updated data; and continuing operation of the data pipeline using the updated data.

The action set may include: in an instance where the error classification is the second error classification: identifying the at least one parameter that is lacked; obtaining a synthetic parameter using historic data; adding the synthetic parameter to the data pipeline to obtain updated data; and continuing operation of the data pipeline using the updated data.

The action set may include: in an instance where the error classification is the third error classification: identifying the changed system of representation of the information; updating the data pipeline based on the changed system of representation of the information; and continuing operation of the updated data pipeline using the data.

Identifying the changed system of representation of the information may include: re-issuing a previous call to the application programming interface to obtain a new response; and comparing the new response to an old response from the previous call to identify the changed system of representation of the information.

The action set may include: in an instance where the error classification is the fourth error classification: identifying the re-ordering of the fields of the responses; and continuing operation of the data pipeline based on the re-ordering of the fields.

Continuing the operation of the data pipeline based on the re-ordering of the fields may include: updating the data pipeline based on the re-ordering of the fields of the responses; and operating the updated data pipeline using the data.

Continuing the operation of the data pipeline based on the re-ordering of the fields may include: updating the data based on the re-ordering of the fields of the responses to obtain updated data; and operating the data pipeline using the updated data.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services utilizing data obtained from any number of data sources and stored in a data repository prior to performing the computer-implemented services. The computer-implemented services may include any type and quantity of computer-implemented services. For example, the computer-implemented services may include monitoring services (e.g., of locations), communication services, and/or any other type of computer-implemented services.

To facilitate the computer-implemented services, the system may include data sources 100. Data sources 100 may include any number of data sources. For example, data sources 100 may include one data source (e.g., data source 100A) or multiple data sources (e.g., 100A-100N). Data sources 100 may include any number of internal data sources (e.g., data sources managed and curated by the system of FIG. 1) and/or external data sources (e.g., data sources managed and curated by other entities). Each data source of data sources 100 may include hardware and/or software components configured to obtain data, store data, provide data to other entities, and/or to perform any other task to facilitate performance of the computer-implemented services.

All, or a portion, of data sources 100 may provide (and/or participate in and/or support the) computer-implemented services to various computing devices operably connected to data sources 100. Different data sources may provide similar and/or different computer-implemented services.

For example, data sources 100 may include any number of temperature sensors positioned in an environment to collect temperature measurements according to a data collection schedule. Data sources 100 may be associated with a data pipeline and, therefore, may collect the temperature measurements, may perform processes to sort, organize, format, and/or otherwise prepare the data for future processing in the data pipeline, and/or may provide the data to other data processing systems in the data pipeline (e.g., via one or more application programming interfaces (APIs)).

Data sources 100 may provide data to data repository 102. Data repository 102 may include any number of data processing systems including hardware and/or software components configured to facilitate performance of the computer-implemented services. Data repository 102 may include a database (e.g., a data lake, a data warehouse, etc.) to store data obtained from data sources 100 (and/or other entities throughout a distributed environment).

Data repository 102 may obtain data (e.g., from data sources 100), process the data (e.g., clean the data, transform the data, extract values from the data, etc.), store the data, and/or may provide the data to other entities (e.g., downstream consumer 104) as part of facilitating the computer-implemented services.

Continuing with the above example, data repository 102 may obtain the temperature measurements from data sources 100 as part of the data pipeline. Data repository 102 may obtain the temperature measurements via a request through an API and/or via other methods. Data repository 102 may curate the temperature data (e.g., identify errors/omissions and correct them, etc.) and may store the curated temperature data temporarily and/or permanently in a data lake or other storage architecture. Following curating the temperature data, data repository 102 may provide the temperature measurements to other entities for use in performing the computer-implemented services.

Data stored in data repository 102 may be provided to downstream consumers 104. Downstream consumers 104 may utilize the data from data sources 100 and/or data repository 102 to provide all, or a portion of, the computer-implemented services. For example, downstream consumers 104 may provide computer-implemented services to users of downstream consumers 104 and/or other computing devices operably connected to downstream consumers 104.

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide the computer-implemented services.

All, or a portion, of downstream consumers 104 may provide (and/or participate in and/or support the) computer-implemented services to various computing devices operably connected to downstream consumers 104. Different downstream consumers may provide similar and/or different computer-implemented services.

Continuing with the above example, downstream consumers 104 may utilize the temperature data from data repository 102 as input data for climate models. Specifically, downstream consumers 104 may utilize the temperature data to simulate future temperature conditions in various environments over time (e.g., to predict weather patterns, climate change, etc.).

Data obtained from data sources 100 may be used by the data pipeline (e.g., may be stored in data repository 102, provided to downstream consumers 104, etc.). Any number of APIs may be integrated into the data pipeline to facilitate communication between components of the data pipeline. To support nominal operation of the APIs, data from data sources 100 may be expected have certain characteristics (e.g., certain parameters, certain ordering of parameters, certain numbers of parameters, etc.). Data obtained from data sources 100 that do not have the expected characteristics may cause misalignment of an API and, therefore, non-nominal operation of the data pipeline.

In general, embodiments disclosed herein may provide methods, systems, and/or devices for remediating misalignment of APIs due to obtaining data with unexpected characteristics from data sources associated with a data pipeline. To do so, the system of FIG. 1 may monitor operation of the data pipeline to identify non-nominal operation of the data pipeline (e.g., misalignment of an API, etc.). When non-nominal operation of the data pipeline is identified, the system may evaluate characteristics of the data associated with the non-nominal operation to obtain an error classification for the data.

In response to obtaining the error classification, the system of FIG. 1 may identify a corresponding action set and may initiate performance of the action set to remediate the misalignment of the data pipeline. The action set may include, for example, re-issuing a request for the data from a data source of data sources 100 and performing a transformation using the data to obtain updated data usable by the data pipeline (e.g., via modification of one or more parameters of the data to avoid misalignment of an API), and/or other actions depending on the error classification.

To provide the above noted functionality, the system of FIG. 1 may: (i) obtain data from one or more data sources associated with the data pipeline, and/or (ii) determine whether the data meets previously determined criteria for the data. If the data meets the previously determined criteria for the data, the system of FIG. 1 may: (i) initiate an error classification process using the data and a schema for identifying types of errors to obtain an error classification for the data, (ii) make an identification of an action set intended to remediate a type of error indicated by the error classification for the data, and/or (iii) initiate performance of the action set in response to the identification to remediate a misalignment of an API used by the data pipeline.

Figure 2:
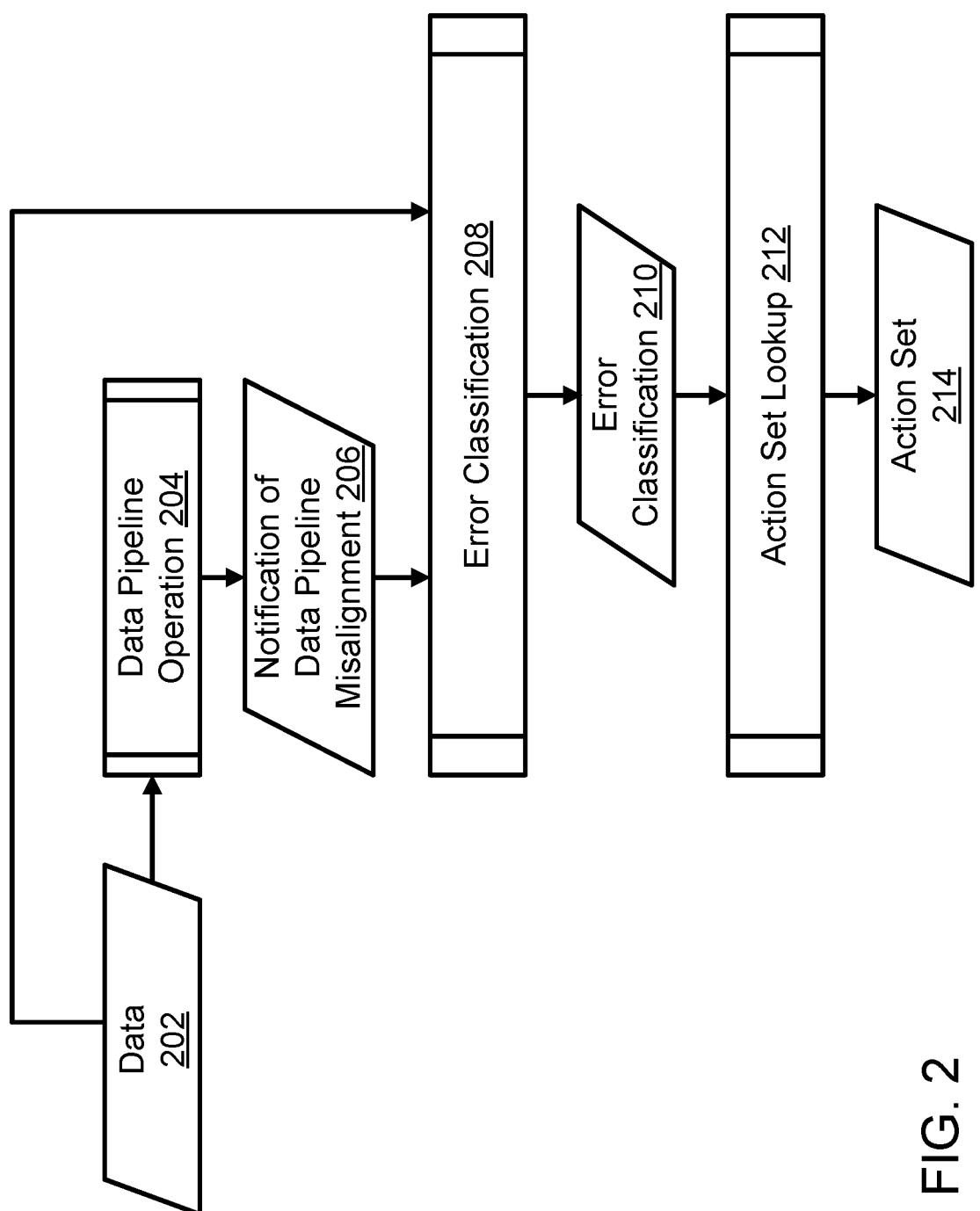
FIG. 2 shows a block diagram illustrating data flow during remediation of a misalignment of a data pipeline in accordance with an embodiment.
Figure 3:
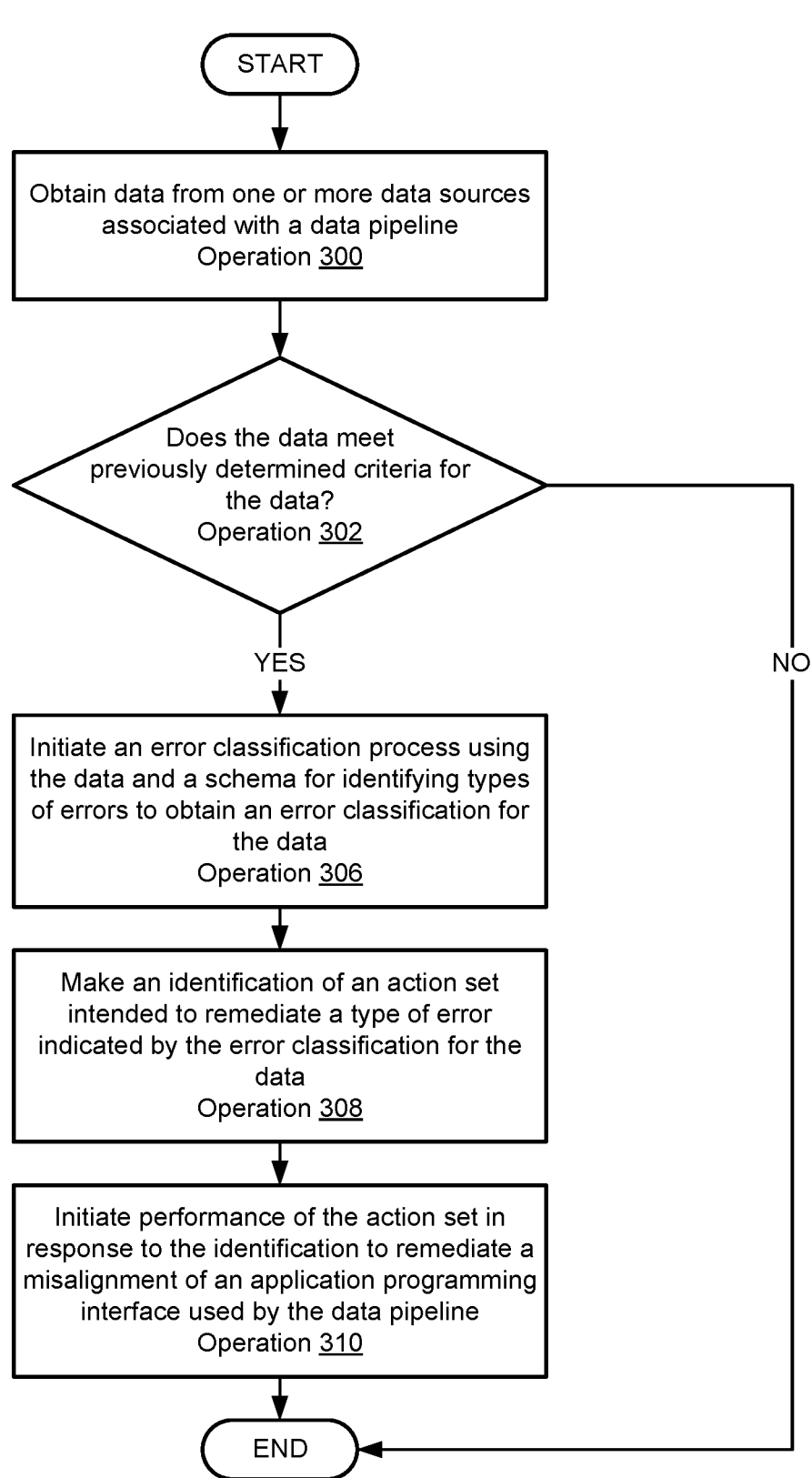
FIG. 3 shows a flow diagram illustrating a method of managing a data pipeline in accordance with an embodiment.

When performing its functionality, data sources 100, data repository 102, and/or downstream consumers 104 may perform all, or a portion, of the methods and/or actions shown in FIGS. 2-3.

Data sources 100, data repository 102, and/or downstream consumers 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data sources 100, data repository 102, and/or downstream consumers 104 are implemented using an internet of things (IoT) device, which may include a computing device. The IoT device may operate in accordance with a communication model and/or management model known to data sources 100, data repository 102, downstream consumers 104, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating data flows and/or processes performed in a system in accordance with an embodiment is shown in FIG. 2.

FIG. 2 shows a block diagram illustrating data flow during remediation of a misalignment of a data pipeline in accordance with an embodiment. The processes shown in FIG. 2 may be performed by any entity shown in the system of FIG. 1 (e.g., a data source similar to data source 100A, a data repository similar to data repository 102, a downstream consumer similar to downstream consumer 104A, etc.) and/or another entity without departing from embodiments disclosed herein.

Consider a scenario in which a data pipeline obtains data 202 from one or more data sources (not shown) similar to any of data sources 100 shown in FIG. 1. Data 202 may include any type of data intended to be inputted into the data pipeline. Data 202 may have any number of characteristics (e.g., a type of parameter, a number of parameters, and ordering of the parameters, etc.). Data 202 may pass through any number of APIs used by the data pipeline during data pipeline operation 204 process.

Data pipeline operation 204 process may include attempting to store data 202 in a data repository, providing data 202 from a data repository to one or more downstream consumers associated with the data pipeline in response to a request for the data, etc. The system may monitor a flow of data 202 during data pipeline operation 204 process and may determine whether data 202 meets previously determined criteria (not shown) during data pipeline operation 204 process. The criteria may indicate that an API used by the data pipeline is misaligned when met. Therefore, any unexpected operation of the data pipeline due to the introduction of data 202 (e.g., misalignment of one or more APIs used by the data pipeline), may indicate that data 202 meets the previously determined criteria.

If data 202 meets the previously determined criteria, data pipeline operation 204 process may include generation of notification of data pipeline misalignment 206. Notification of data pipeline misalignment 206 may flag (e.g., label) data 202 for further analysis by the system, may include an indicator of one or more APIs used by the data pipeline that are misaligned, and/or may include statistics related to the flow of data 202 through the data pipeline.

In response to obtaining notification of data pipeline misalignment 206, the system may perform error classification 208 process using data 202. Error classification 208 process may include obtaining a first set of characteristics associated with data 202 and comparing the first set of the characteristics to a second set of the characteristics indicated by a schema for identifying types of errors in data from data sources used by the data pipeline (not shown). The schema for identifying the types of the errors may include: (i) the criteria, (ii) instructions for implementing error classification 208 process, and/or (iii) other instructions.

The first set of the characteristics (not shown) may include, for example, a number of parameters of data 202, an ordering of parameters of data 202, a system of representation of information conveyed by data 202, and/or other characteristics.

The second set of the characteristics (not shown) may include characteristics that when met, ensure alignment of the data pipeline. The second set of the characteristics may include characteristics similar to those listed above with respect to the first set of the characteristics (e.g., an expected number of parameters, that when met, does not cause misalignment of the data pipeline).

Error classification 208 process may yield error classification 210. Error classification 210 may include an indicator of a difference between the first set of the characteristics (of data 202) and the second set of the characteristics. Error classification 210 may include at least one of the following types of error classifications: (i) a first error classification indicating that data 202 includes at least one extra parameter, (ii) a second error classification indicating that data 202 lacks at least one expected parameter, (iii) a third error classification indicating a change in a system of representation of information conveyed by the data, and/or (iv) a fourth error classification indicating a re-ordering of fields of responses from the API. Error classification 210 may include other types of error classifications without departing from embodiments disclosed herein. Refer to FIGS. 4A-4D for examples of each type of error classification.

In response to obtaining error classification 210, the system may perform action set lookup 212 process to identify an action set intended to remediate the type of error indicated by error classification 210. Action set lookup 212 process may include, for example, performing a lookup process using an action set lookup table and error classification 210 as a key for the action set lookup table. Action set lookup 212 process may include generating identification of action set 214.

Action set 214 may include instructions for remediation of the type of error associated with error classification 210. The instructions may be intended to be performed by an entity to avoid future misalignment of the data pipeline due to the use of data 202 and/or future data obtained from one or more data sources associated with data 202. Action set 214 may include instructions for implementing any number of action sets responsive to errors identified by error classification 210. Refer to FIG. 3 for additional details regarding performing action sets tailored to each type of the four potential error classification listed above.

In an embodiment, the one or more entities performing the operations shown in FIG. 2 are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage operation of data processing systems throughout a distributed environment. FIG. 3 illustrates methods that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data pipeline in accordance with an embodiment is shown. The method may be performed, for example, by a data source, data repository, downstream consumer, and/or any other entity.

At operation 300, data from one or more data sources associated with a data pipeline are obtained. Obtaining the data may include: (i) reading the data from storage, (ii) requesting the data from the one or more data sources and receiving the data as a transmission in response to the request, (iii) receiving the data from the one or more data sources automatically (e.g., according to some previously determined schedule, etc.), (iv) requesting the data from another entity to which the one or more data sources provided the data, (v) accessing a database (locally or off-site) in which the data is stored, and/or (vi) any other method of obtaining the data intended for use by the data pipeline.

At operation 302, it is determined whether the data meets previously determined criteria for the data. As previously described with respect to FIG. 2, the criteria may be met by the data if any API used by the data pipeline is misaligned following use of the data by the data pipeline. Determining whether the data meets the previously determined criteria for the data may include obtaining the criteria. Obtaining the criteria may include: (i) reading the criteria from storage, (ii) receiving the criteria from another entity (in response to a request for the criteria and/or automatically in accordance with any type of schedule), and/or (iii) by generating the criteria.

The criteria may be generated by: (i) obtaining a set of preferences from a downstream consumer and/or any other entity, (ii) parsing the preferences into a set of characteristics based on historic data and/or other data, and/or (iii) encapsulating the set of the characteristics into a data structure.

Determining whether the data meets the previously determined criteria may also include: (i) initiating operation of the data pipeline using the data, and/or (ii) determining whether any APIs are misaligned due to the operation of the data pipeline using the data.

Initiating the operation of the data pipeline using the data may include: (i) inputting the data into the data pipeline via one or more APIs, (ii) providing the data to another entity responsible for operating the data pipeline, and/or (iii) other methods.

Determining whether any APIs are misaligned due to the operation of the data pipeline using the data may include: (i) obtaining a performance report in response to the operation of the data pipeline using the data and/or (ii) failing to obtain a performance alert indicating misalignment of one or more APIs used by the data pipeline. The performance report may be generated automatically at regular intervals, may be generated upon request, and/or may be obtained via other methods and/or schedules without departing from embodiments disclosed herein. The performance report may include an indication of nominal or non-nominal operation of any APIs used by the data pipeline as a result of the data being inputted into the data pipeline. Non-nominal operation of any API may indicate that the data meets the previously determined criteria.

Determining whether the data meets the previously determined criteria for the data may also include flagging the data for additional analysis. Flagging the data for additional analysis may include labeling the data, transmitting instructions to an entity to perform the further analysis, storing the data in storage reserved for data requiring additional analysis, and/or other actions.

If the data meets the previously determined criteria for the data, the method may proceed to operation 306.

At operation 306, an error classification process is initiated using the data and a schema for identifying types of errors to obtain an error classification for the data.

Initiating the error classification process may include: (i) obtaining a first set of characteristics associated with the data, and/or (ii) comparing the first set of the characteristics associated with the data to a second set of the characteristics indicated by the schema for identifying the types of the errors to obtain an error classification for the data.

Obtaining the first set of the characteristics associated with the data may include: (i) reading the first set of the characteristics from storage, (ii) transmitting the data to another entity responsible for generating the first set of the characteristics, (iii) generating the first set of the characteristics, and/or (iv) other actions.

Generating the first set of the characteristics may include feeding the data into an inference model or other rules-based engine trained to generate a previously identified set of characteristics when given input data. The first set of the characteristics may be generated using other methods (e.g., manual identification by a subject matter expert (SME), etc.) without departing from embodiments disclosed herein.

Comparing the first set of the characteristics to the second set of the characteristics may include: (i) obtaining the schema for identifying the types of the errors, (ii) obtaining a difference between the first set of the characteristics and the second set of the characteristics indicated by the schema, (iii) obtaining the error classification for the data based on the difference.

Obtaining the error classification for the data may include: (i) inputting information (e.g., the first set of the characteristics, the second set of the characteristics, the difference, etc.) into an inference model or rules-based engine to obtain the error classification, (ii) by using the difference as a key for an error classification lookup table and obtaining the error classification as an output from a lookup process using the error classification lookup table, (iii) by reading the error classification from storage, (iv) by transmitting the difference to another entity responsible for determining the error classification, and/or (v) other methods.

For example, the difference may indicate that the first set of the characteristics includes four parameters, and the second set of the characteristics includes three parameters (e.g., one unexpected parameter in the data). Therefore, the error classification may include "extra parameter" or any other indication that a specific parameter is an unexpected parameter.

At operation 308, an identification of an action set intended to remediate a type of error indicated by the error classification for the data is made. Making the identification of the action set may include: (i) performing an action set lookup process using an action set lookup table and the error classification as a key for the action set lookup table, (ii) by feeding the error classification into an inference model or rules-based engine and obtaining the action set as an output from the inference model or rules-based engine, (iii) by providing the error classification to another entity responsible for identifying the action set and obtaining the action set in response to the error classification from the entity, and/or via other methods.

At operation 310, in response to the identification, performance of the action set is initiated to remediate a misalignment of an API used by the data pipeline.

In an instance where the error classification is the first error classification (the data includes an extra parameter), the action set may include: (i) identifying the extra parameter, (ii) discarding the extra parameter from the data pipeline to obtain updated data, and/or (iii) continuing operation of the data pipeline using the updated data.

Identifying the extra parameter may include: (i) obtaining a list of expected parameters for the data, (ii) comparing the list of the expected parameters for the data to a list of parameters of the data (e.g., the first set of the characteristics), and/or (iii) identifying a difference between the list of the expected parameters for the data and the list of parameters of the data, the difference including the extra parameter.

Obtaining a list of expected parameters for the data may include: (i) reading the list of the expected parameters for the data from storage (e.g., as part of the criteria included in the schema for identifying the types of the errors), (ii) generating the list of the expected parameters using historic data indicative of a number and type of parameters previously obtained from the data sources, and/or (iii) other methods.

Discarding the extra parameter from the data pipeline may include: (i) storing the extra parameter in a cache associated with one or more data processing systems used by the data pipeline, and/or (ii) deleting the extra parameter from the data usable by the data pipeline to obtain the updated data. Discarding the extra parameter from the data pipeline may also include transmitting the data to another entity responsible for discarding the extra parameter and receiving the updated data in response.

Figure 4A:
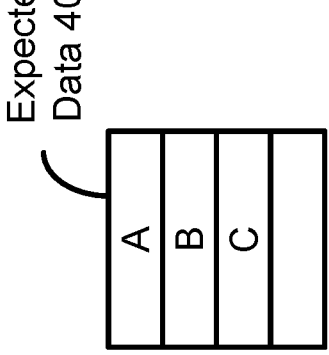
FIGS. 4A-4D show block diagrams illustrating a system in accordance with an embodiment over time.
Figure 4A:
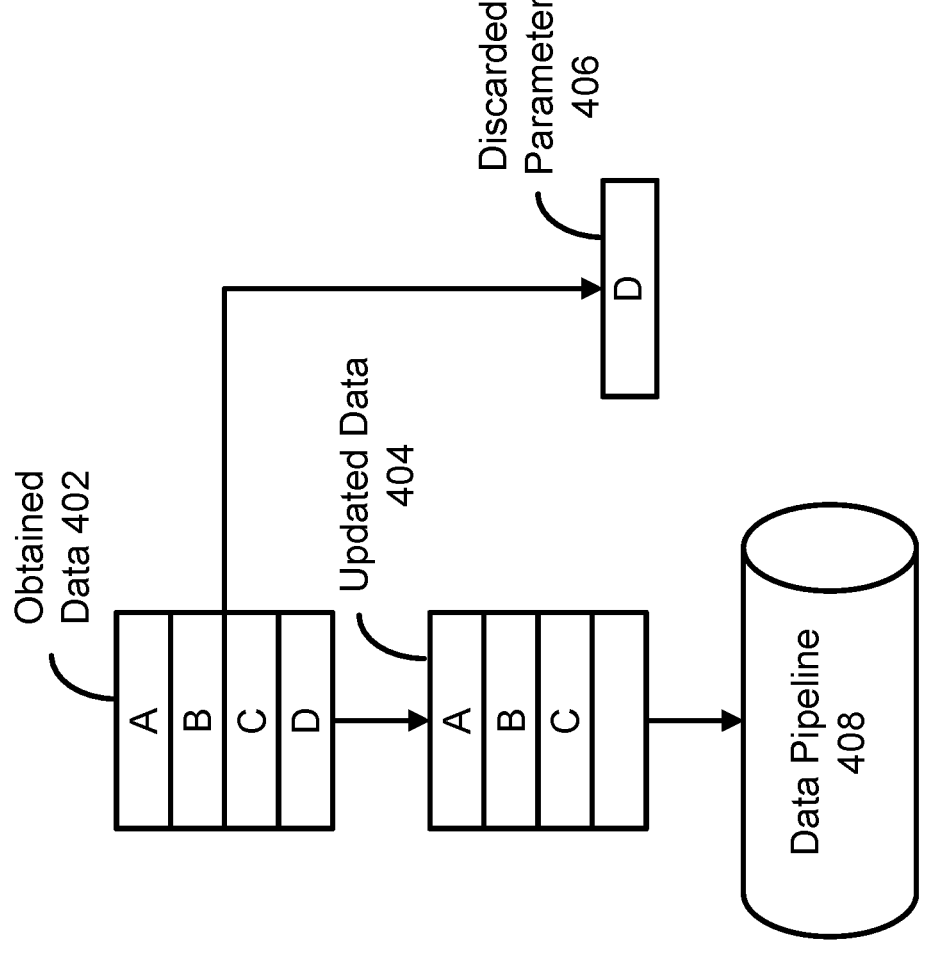

Continuing the operation of the data pipeline using the updated data may include: (i) feeding the updated data into the data pipeline, (ii) re-issuing a request for the data via an API used by the data pipeline and transforming data obtained in response to the re-issued request using an algorithm for discarding the extra parameter, (iii) transmitting the updated data to another entity responsible for inputting the updated data into the data pipeline, and/or (iv)

other methods. Refer to FIG. 4A for an example where the error classification is the first error classification.

In an instance where the error classification is the second error classification (data lacks at least one expected parameter), the action set may include: (i) identifying the at least one parameter that is lacked, (ii) obtaining a synthetic parameter using historic data, (iii) adding the synthetic parameter to the data pipeline to obtain updated data, and/or (iv) continuing operation of the data pipeline using the updated data.

Identifying the at least one parameter that is lacked may include: (i) obtaining a list of expected parameters for the data, (ii) comparing the list of the expected parameters for the data to a list of parameters of the data (e.g., the first set of the characteristics), and/or (iii) identifying a difference between the list of the expected parameters for the data and the list of parameters of the data, the difference including the at least one parameter that is lacked.

Obtaining a list of expected parameters for the data may include: (i) reading the list of the expected parameters for the data from storage (e.g., as part of the criteria included in the schema for identifying the types of the errors), (ii) generating the list of the expected parameters using historic data indicative of a number and type of parameters previously obtained from the data sources, and/or (iii) other methods.

Obtaining the synthetic parameter using the historic data may include: (i) training an inference model using the historic data to predict missing parameters given other parameters as input for the inference model, (ii) feeding one or more of the parameters of the data into the inference model and/or (iii) obtaining the synthetic parameter as output from the inference model, the synthetic parameter being a prediction for the missing parameter.

Obtaining the synthetic parameter using the historic data may also include: (i) transmitting the historic data to another entity responsible for generating the synthetic parameter, (ii) generating the synthetic parameter based on a statistical characterization of the historic data (e.g., a mode for the at least one parameter that is lacked), and/or (iii) other methods.

Figure 4B:
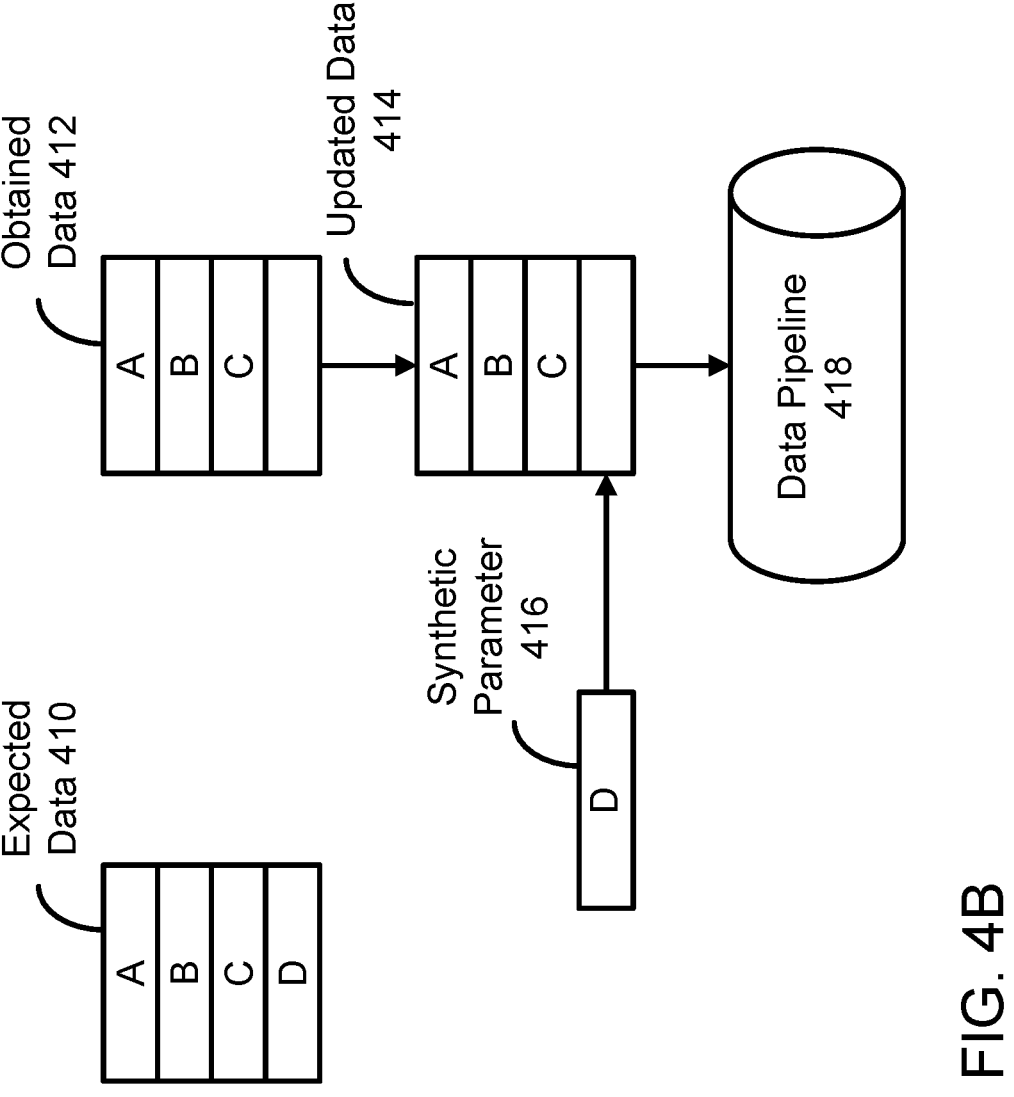

Continuing the operation of the data pipeline using the updated data may include: (i) feeding the updated data into the data pipeline, (ii) re-issuing a request for the data via an API used by the data pipeline and transforming data obtained in response to the re-issued request using an algorithm for replacing the parameter that is lacked, (iii) transmitting the updated data to another entity responsible for inputting the updated data into the data pipeline, and/or (iv) other methods. Refer to FIG. 4B for an example where the error classification is the second error classification.

In an instance where the error classification is the third error classification (a change in a system of representation of information conveyed by the data), the action set may include: (i) identifying the changed system of representation of the information, (ii) updating the data pipeline based on the changed system of representation of the information, and/or (iii) continuing operation of the data pipeline using the data.

Identifying the changed system of representation of the information may include: (i) re-issuing a previous call to the API to obtain a new response and/or (ii) comparing the new response to an old response from the previous call to identify the changed system of representation of the information.

Re-issuing a previous call to the API may include: (i) obtaining information associated with the previous call made to the API (e.g., an identifier used in the request, etc.), (ii) submitting a new request (e.g., a call) to the API using the identifier, and/or (iii) receiving the new response from the API.

Comparing the new response to the old response from the previous call may include: (i) obtaining the old response to the previous call, (ii) obtaining a difference between the new response and the old response, and/or (iii) generating a schema for interpreting new responses from the API based on the difference.

For example, a downstream consumer (e.g., a data processing system) associated with the data pipeline may regularly query an API for a response regarding whether rainfall occurred on specified days. The downstream consumer may have historically received responses from the API including a field with a "yes" or "no" indicator. However, following a change in the system of representation of the information conveyed by the response, the API may return a response including a field with a "1" indicator.

To determine how the system of representation has changed, the downstream consumer may access historic calls made to the API (e.g., a call from a from a previous day in which the response included "yes"). The downstream consumer may re-issue the same call (e.g., including a query for whether rainfall occurred on the day associated with the previous call) and may obtain a response including the number "1." Therefore, the downstream consumer may determine that "1" is a new means of representing what was previously conveyed by a response including "yes."

Updating the data pipeline based on the changed system of representation of the information may include: (i) implementing the schema for interpreting new responses from the API so that data from any response that utilizes the new system of representation of information will be transformed into a response using the old system of representation of information to obtain the updated data pipeline, (ii) transmitting the schema for interpreting new responses to another entity responsible for updating the data pipeline, and/or (iii) other methods.

Figure 4C:
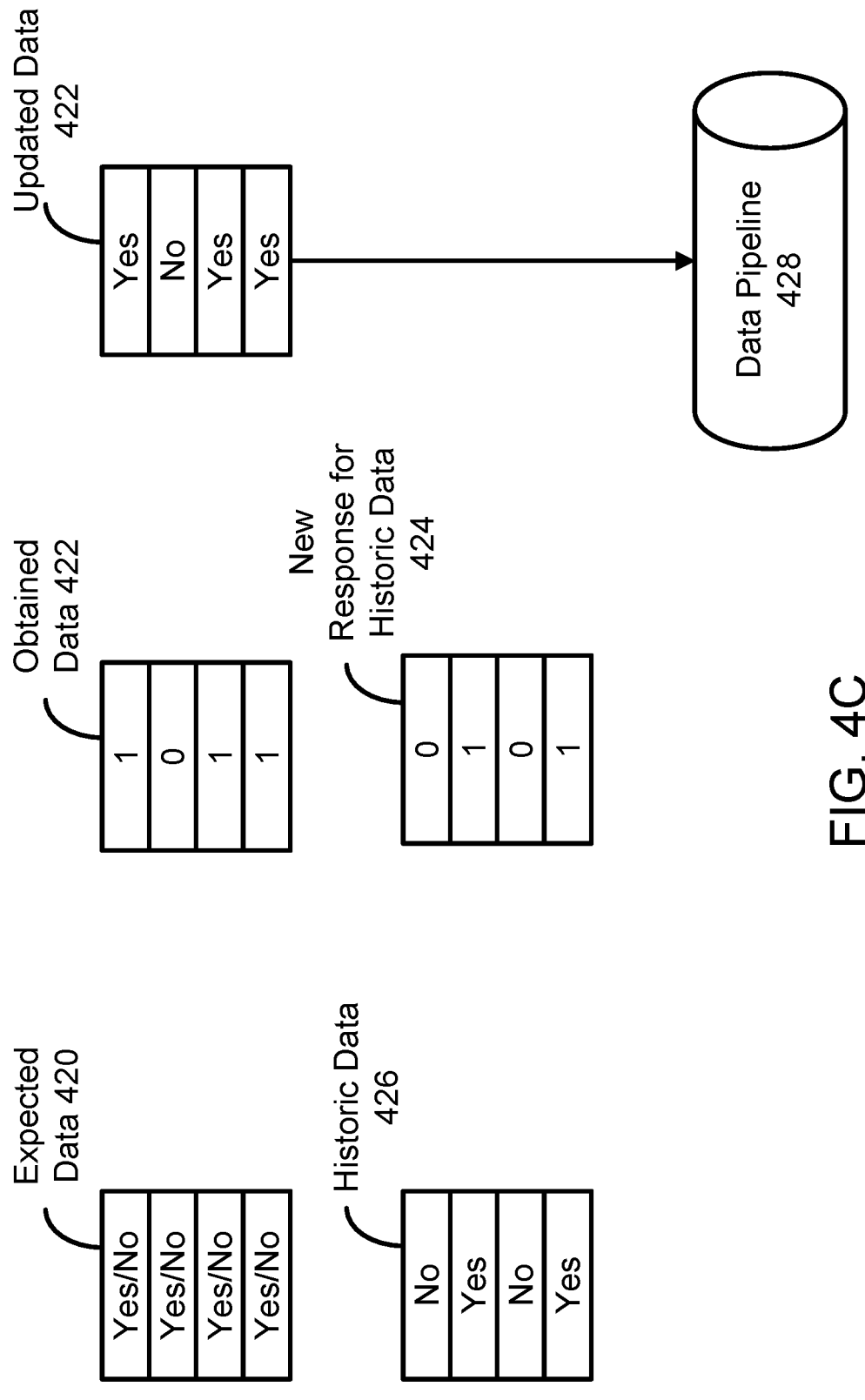

Continuing operation of the data pipeline using the data may include: (i) feeding the data into the updated data pipeline, (ii) re-issuing a request for the data via an API used by the updated data pipeline and obtaining a transformed response to the re-issued request based on the implemented schema for interpreting new responses, (iii) transmitting the data to another entity responsible for inputting data into the updated data pipeline, and/or (iv) other methods. Refer to FIG. 4C for an example where the error classification is the third error classification.

In an instance where the error classification is the fourth error classification (a re-ordering of fields of responses from the API), initiating performance of the action set may include: (i) identifying the re-ordering of the fields of the responses, and/or (ii) continuing operation of the data pipeline based on the re-ordering of the fields.

Identifying the re-ordering of the fields of the responses may include: (i) identifying a first ordering of the fields of the response associated with an old response (e.g., from historic data), (ii) identifying a second ordering of the fields of the response associated with a new response, (iii) comparing the first ordering of the fields of the response to the second ordering of the fields of the response to obtain a difference in the ordering, and/or (iv) utilizing the difference in the ordering to determine the re-ordering of the fields.

The re-ordering of the fields may include a change in a naming convention for one or more of the parameters. As such, identifying the re-ordering of the fields of the responses may also include: (i) re-issuing a previous call to the API to obtain a new response for the previous call and/or (ii) comparing the new response to an old response from the previous call to identify the changed naming convention.

Continuing the operation of the data pipeline based on the re-ordering of the fields may include: (i) updating the data pipeline based on the re-ordering of the fields of the responses, and/or (ii) operating the data pipeline using the data.

Updating the data pipeline based on the re-ordering of the fields of the responses may include: (i) implementing a change to one or more APIs used by the data pipeline (e.g., via a change and/or addition of code, a data scheme change, etc.) to re-order the fields of the response (and/or map names of parameters using the new naming convention to names of parameters using an old naming convention for each field of the response) prior to feeding the response into other portions of the data pipeline, (ii) transmitting instructions to update the data pipeline to another entity responsible for updating the data pipeline, (iii) updating (e.g., via a code change, etc.) the data pipeline to expect the new ordering of the fields of the response (and/or a new naming convention for one or more of the fields of the response), and/or (iv) other methods.

Operating the updated data pipeline using the data may include: (i) feeding the data into the updated data pipeline, (ii) providing the data to another entity responsible for feeding the data into the updated data pipeline, and/or (iii) other methods.

Continuing the operation of the data pipeline based on the re-ordering of the fields may include: (i) updating the data based on the re-ordering of the fields of the responses to obtain updated data and/or (ii) operating the data pipeline using the updated data.

Updating the data based on the re-ordering of the fields of the responses may include: (i) performing an operation to re-order the fields of the response to match the first ordering of the fields of the responses, (ii) generating an application (e.g., a package of code, etc.) capable of re-ordering fields of responses to match the first ordering for future data intended to be fed into the data pipeline, (iii) transmitting instructions to another entity responsible for updating the data, and/or (iv) other methods.

Figure 4D:
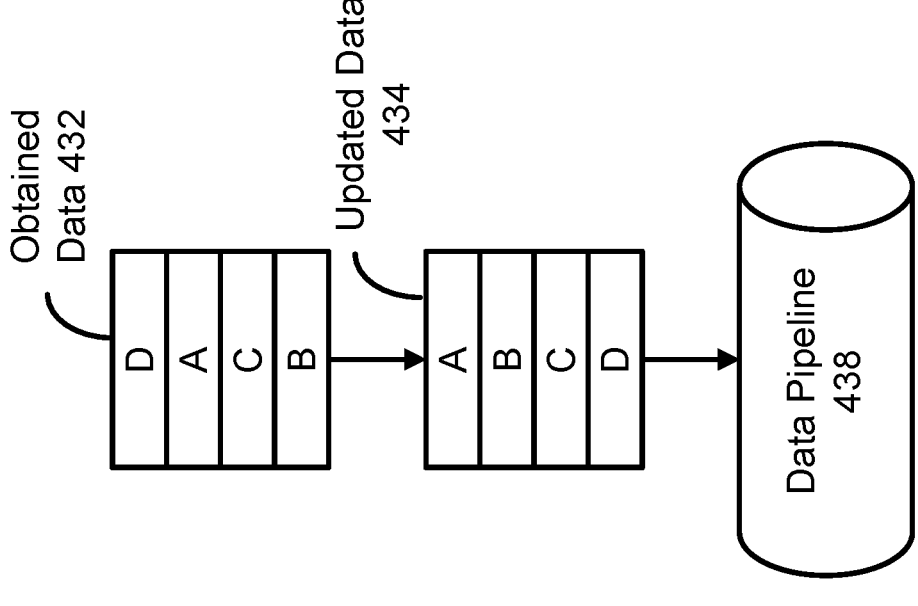
Figure 4D:
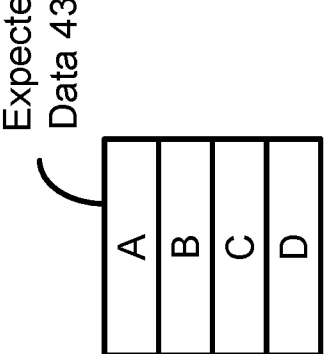

Operating the data pipeline using the updated data may include: (i) feeding the updated data into the data pipeline, (ii) providing the updated data to another entity responsible for feeding the updated data into the data pipeline, and/or (iii) other methods. Refer to FIG. 4D for an example where the error classification is the fourth error classification.

Initiating, in response to the identification to remediate the misalignment of the API used by the data pipeline may include: (i) performing the action set (e.g., one of the previously described action sets) based on the error classification, (ii) transmitting the error classification to another entity along with instructions for performing the action set based on the error classification, and/or (iii) other methods.

The method may end following operation 310.

Returning to operation 302, the method may end following operation 302 if the data does not meet the previously determined criteria for the data.

Turning to FIG. 4A, expected data 400 may represent characteristics of fields of a response (e.g., a number of parameters, etc.) that are expected in responses to calls to an API used by a data pipeline (e.g., data pipeline 408). Obtained data 402 may represent fields of a response obtained from an API that includes an unexpected parameter (e.g., parameter D in the fourth field of the response as shown in FIG. 4A). To remediate the extra parameter and continue operation of data pipeline 408, the system may generate updated data 404 by discarding discarded parameter 406 from data pipeline 408 and continuing operation of data pipeline 408 using updated data 404. Discarded parameter 406 may be stored in storage and/or deleted from data pipeline 408.

Turning to FIG. 4B, expected data 410 may represent characteristics of fields of a response (e.g., a number of parameters, etc.) that are expected in data obtained in response to calls to an API used by data pipeline 418. Obtained data 412 may represent data included in a response obtained from an API used by data pipeline 418 that lacks an expected parameter (e.g., parameter D in the fourth field of expected data 410). To remediate the lack of the expected parameter, the system may supplement obtained data 412 with synthetic parameter 416 to obtain updated data 414. Synthetic parameter 416 may include an inference generated, for example, by an inference model trained to predict missing parameters based on historic data for data pipeline 418. Operation of data pipeline 418 may continue using updated data 414.

Turning to FIG. 4C, expected data 420 may represent characteristics of fields of a response (e.g., a system of representation of information, etc.) that are expected in data obtained in response to calls to an API used by data pipeline 428. For example, expected data 420 may indicate that each field of a response is expected to include either a "yes" or "no" response. Obtained data 422 may represent data included in a response obtained from an API used by data pipeline 428 that utilizes a new system of representation of information (e.g., each response includes "0" or "1"). To remediate the change in the system of representation of information, the system may retrieve historic data 426 including previously obtained data that follows the former system of representation of information (e.g., a "yes" or "no" response). The system may issue a new call to the API for the same data (e.g., data that matches historic data 426) to obtain new response for historic data 424. New response for historic data 424 may allow the system to translate the old system of representation of information to the new system of representation of information (e.g., "yes" corresponds to "1" and "no" corresponds to "0"). Updated data 422 may be generated based on this translation and operation of data pipeline 428 may continue using updated data 422.

Turning to FIG. 4D, expected data 430 may represent characteristics of fields of a response (e.g., an ordering of parameters, etc.) that are expected in data obtained in response to calls to an API used by data pipeline 438. For example, expected data 430 may include four different fields (e.g., A, B, C, D) and each field may represent a specific type of data (e.g., temperature measurements, pressure measurements, etc.). The fields may be expected to appear in a certain order (e.g., A in the first field, B in the second field, C in the third field, and D in the fourth field) as shown by expected data 430.

Obtained data 432 may represent data included in a response obtained from an API used by data pipeline 438 that includes the same parameters (e.g., A, B, C, and D) with a new ordering of the fields. Specifically, the fields appear in the following order: D in the first field, A in the second field, C in the third field, and B in the fourth field. To remediate the re-ordering of the fields of the response in obtained data 432, the system may re-order the fields according to expected data 430 to obtain updated data 434. Data pipeline 438 may continue to operate using updated data 434.

Similarly, data pipeline 438 may be updated to generate a new expectation in accordance with the new ordering of the fields shown by obtained data 432 (not shown). If this occurs, an updated data pipeline may be obtained (not shown) and operation of the updated data pipeline may resume using obtained data 432 without any transformations being performed on obtained data 432.

Figure 5:
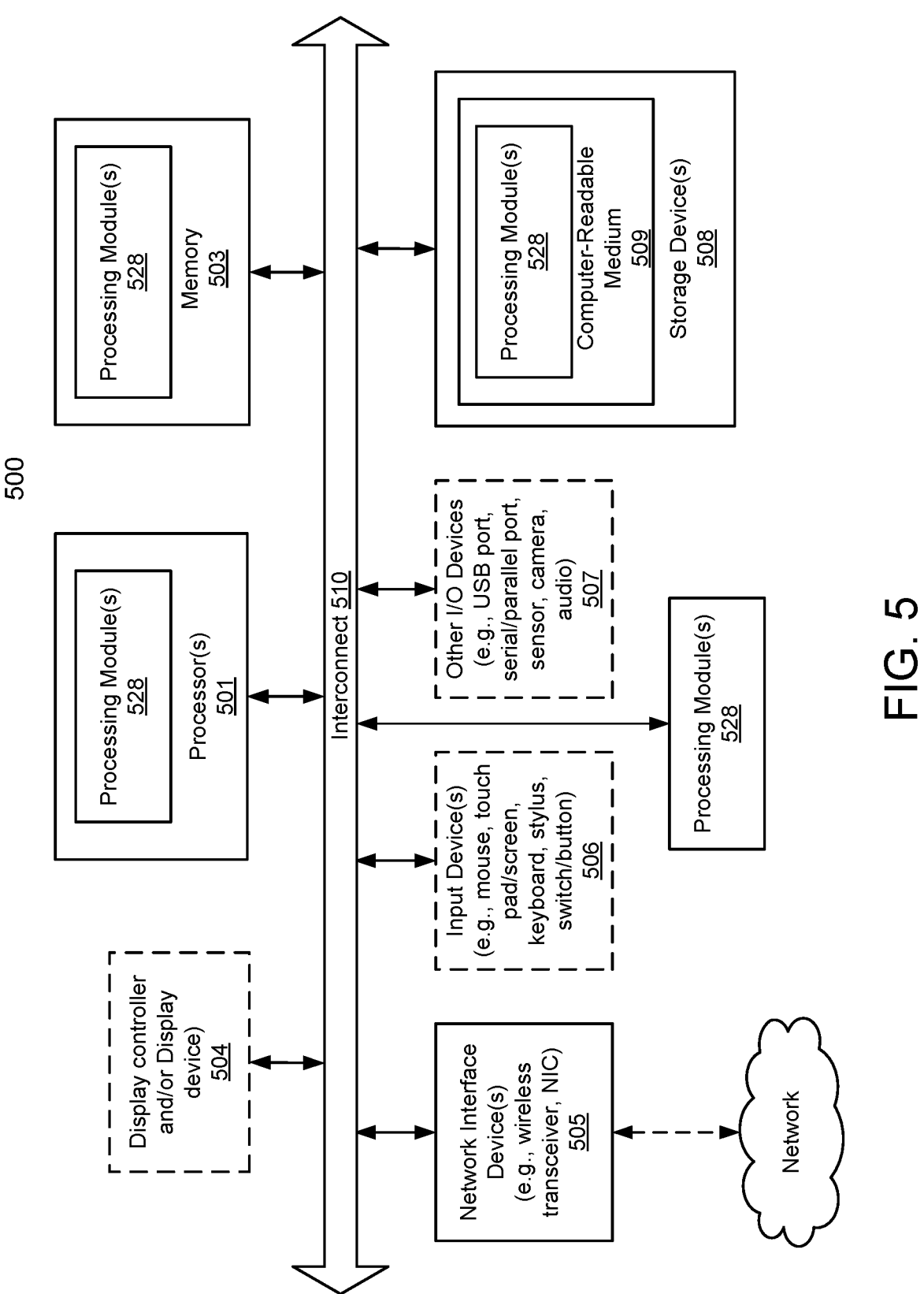
FIG. 5 shows a block diagram illustrating a data processing system in accordance with an embodiment.

Any of the components illustrated in FIGS. 1-4D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data pipeline, the method comprising:

obtaining data from one or more data sources associated with the data pipeline;

making a determination regarding whether the data meets previously determined misalignment criteria for the data, the previously determined misalignment criteria indicate that an application programming interface (API) used by the data pipeline to obtain the data is misaligned;

in an instance of the determination in which the data meets the previously determined misalignment criteria:

initiating an error classification process using the data and a schema for identifying types of errors to obtain an error classification for the data, the schema for identifying error types is associated with error classifications comprising:

a first error classification indicating that the data comprises at least one extra parameter;

a second error classification indicating that the data lacks at least one expected parameter;

a third error classification indicating a change in a system of representation of information conveyed by the data; and a fourth error classification indicating an unexpected re-ordering of fields of responses from the API, the unexpected re-ordering of the fields resulting from an error by the API, where the error classification for the data is at least one of the error classifications;

making an identification of an action set intended to remediate a type of error indicated by the error classification for the data; and in response to the identification, initiating performance of the action set to remediate the misalignment, the action set comprising generating and executing an algorithm to correct the type of error indicated by the error classification for the data in subsequent data obtained by the API that is misaligned after the subsequent data is obtained by the API that is misaligned and before the subsequent data is injected into the data pipeline.

2. The method of claim 1, wherein the API used by the data pipeline to obtain the data being misaligned indicates that the data is erroneous, and the error classification process is initiated after the data is already determined as being erroneous due to the API used by the data pipeline to obtain the data already being determined as being misaligned and comprises:

obtaining a first set of characteristics associated with the data; and comparing the first set of the characteristics associated with the data to a second set of the characteristics indicated by the schema for identifying types of errors to obtain the error classification for the data, the second set of the characteristics comprising characteristics that when met ensure alignment of the data pipeline.

3. The method of claim 2, wherein the action set comprises:

in an instance of the initiating of the error classification process where the error classification is the first error classification:

identifying the at least one extra parameter;

discarding the at least one extra parameter from the data pipeline to obtain updated data; and continuing operation of the data pipeline using the updated data.

4. The method of claim 2, wherein the action set comprises:

in an instance of the initiating of the error classification process where the error classification is the second error classification:

identifying the at least one expected parameter that is lacked;

obtaining a synthetic parameter using historic data;

adding the synthetic parameter to the data pipeline to obtain updated data; and continuing operation of the data pipeline using the updated data.

5. The method of claim 2, wherein the action set comprises:

in an instance of the initiating of the error classification process where the error classification is the third error classification:

identifying the changed system of representation of the information;

updating the data pipeline based on the changed system of representation of the information; and continuing operation of the updated data pipeline using the data.

6. The method of claim 5, wherein identifying the changed system of representation of the information comprises:

re-issuing a previous call to the API to obtain a new response; and comparing the new response to an old response from the previous call to identify the changed system of representation of the information.

7. The method of claim 2, wherein the action set comprises:

in an instance of the initiating of the error classification process where the error classification is the fourth error classification:

identifying the re-ordering of the fields of the responses to obtain a new order of the fields based on the re-ordering that is identified, the new order of the fields being different from an old order of the fields that was expected by the data pipeline; and continuing operation of the data pipeline based on the re-ordering of the fields.

8. The method of claim 7, wherein continuing the operation of the data pipeline based on the re-ordering of the fields comprises:

replacing the old order of the fields with the new order of the fields by setting the new order of the fields as a new expectation for a normal operation of the data pipeline;

operating the data pipeline as an updated data pipeline that uses the new order of the fields; and updating the API used by the data pipeline to obtain new data in the new order of the fields.

9. The method of claim 7, wherein continuing the operation of the data pipeline based on the re-ordering of the fields comprises:

updating the data based on the re-ordering of the fields of the responses to obtain updated data; and operating the data pipeline using the updated data.

10. A non-transitory machine-readable medium having instructions stored therein, which when executed by a processor, cause the processor to perform operations for managing a data pipeline, the operations comprising:

obtaining data from one or more data sources associated with the data pipeline;

making a determination regarding whether the data meets previously determined misalignment criteria for the data, the previously determined misalignment criteria indicate that an application programming interface (API) used by the data pipeline to obtain the data is misaligned;

in an instance of the determination in which the data meets the previously determined misalignment criteria:

initiating an error classification process using the data and a schema for identifying types of errors to obtain an error classification for the data, the schema for identifying error types is associated with error classifications comprising:

a first error classification indicating that the data comprises at least one extra parameter;

a second error classification indicating that the data lacks at least one expected parameter;

a third error classification indicating a change in a system of representation of information conveyed by the data; and a fourth error classification indicating an unexpected re-ordering of fields of responses from the API, the unexpected re-ordering of the fields resulting from an error by the API, where the error classification for the data is at least one of the error classifications;

making an identification of an action set intended to remediate a type of error indicated by the error classification for the data; and in response to the identification, initiating performance of the action set to remediate the misalignment, the action set comprising generating and executing an algorithm to correct the type of error indicated by the error classification for the data in subsequent data obtained by the API that is misaligned after the subsequent data is obtained by the API that is misaligned and before the subsequent data is injected into the data pipeline.

11. The non-transitory machine-readable medium of claim 10, wherein the API used by the data pipeline to obtain the data being misaligned indicates that the data is erroneous, and the error classification process is initiated after the data is already determined as being erroneous due to the API used by the data pipeline to obtain the data already being determined as being misaligned and comprises:

obtaining a first set of characteristics associated with the data; and comparing the first set of the characteristics associated with the data to a second set of the characteristics indicated by the schema for identifying types of errors to obtain the error classification for the data, the second set of the characteristics comprising characteristics that when met ensure alignment of the data pipeline.

12. The non-transitory machine-readable medium of claim 11, wherein the action set comprises:

in an instance of the initiating of the error classification process where the error classification is the first error classification:

identifying the at least one extra parameter;

discarding the at least one extra parameter from the data pipeline to obtain updated data; and continuing operation of the data pipeline using the updated data.

13. A data processing system, comprising:

a processor; and a memory coupled to the processor to store instructions, which when executed by the processor, cause the processor to perform operations for managing a data pipeline, the operations comprising:

obtaining data from one or more data sources associated with the data pipeline;

making a determination regarding whether the data meets previously determined misalignment criteria for the data, the previously determined misalignment criteria indicate that an application programming interface (API) used by the data pipeline to obtain the data is misaligned;

in an instance of the determination in which the data meets the previously determined misalignment criteria:

initiating an error classification process using the data and a schema for identifying types of errors to obtain an error classification for the data, the schema for identifying error types is associated with error classifications comprising:

a first error classification indicating that the data comprises at least one extra parameter;

a second error classification indicating that the data lacks at least one expected parameter;

a third error classification indicating a change in a system of representation of information conveyed by the data; and a fourth error classification indicating an unexpected re-ordering of fields of responses from the API, the unexpected re-ordering of the fields resulting from an error by the API, where the error classification for the data is at least one of the error classifications;

making an identification of an action set intended to remediate a type of error indicated by the error classification for the data; and in response to the identification, initiating performance of the action set to remediate the misalignment, the action set comprising generating and executing an algorithm to correct the type of error indicated by the error classification for the data in subsequent data obtained by the API that is misaligned after the subsequent data is obtained by the API that is misaligned and before the subsequent data is injected into the data pipeline.

14. The data processing system of claim 13, wherein the API used by the data pipeline to obtain the data being misaligned indicates that the data is erroneous, and the error classification process is initiated after the data is already determined as being erroneous due to the API used by the data pipeline to obtain the data already being determined as being misaligned and comprises:

obtaining a first set of characteristics associated with the data; and comparing the first set of the characteristics associated with the data to a second set of the characteristics indicated by the schema for identifying types of errors to obtain the error classification for the data, the second set of the characteristics comprising characteristics that when met ensure alignment of the data pipeline.

15. The data processing system of claim 14, wherein the action set comprises:

in an instance of the initiating of the error classification process where the error classification is the first error classification:

identifying the at least one extra parameter;

discarding the at least one extra parameter from the data pipeline to obtain updated data; and continuing operation of the data pipeline using the updated data.

16. The method of claim 1, wherein making the determination regarding whether the data meets the previously determined misalignment criteria for the data comprises:

obtaining a performance report regarding an operation of the data pipeline while the data is in the data pipeline; and using the performance report to determine whether the API used to obtain the data is misaligned.

17. The method of claim 1, wherein making the determination regarding whether the data meets the previously determined misalignment criteria for the data comprises and before the data is determined to be erroneous:

observing an operation of the data pipeline while the data is being used in the data pipeline; and using the operation of the data pipeline to determine whether the API used to obtain the data is misaligned.

18. The data processing system of claim 14, wherein the action set comprises:

in an instance of the initiating of the error classification process where the error classification is the second error classification:

identifying the at least one expected parameter that is lacked;

obtaining a synthetic parameter using historic data;

adding the synthetic parameter to the data pipeline to obtain updated data; and continuing operation of the data pipeline using the updated data.

19. The data processing system of claim 14, wherein the action set comprises:

in an instance of the initiating of the error classification process where the error classification is the third error classification:

identifying the changed system of representation of the information;

updating the data pipeline based on the changed system of representation of the information; and continuing operation of the updated data pipeline using the data.

20. The data processing system of claim 19, wherein identifying the changed system of representation of the information comprises:

re-issuing a previous call to the API to obtain a new response; and comparing the new response to an old response from the previous call to identify the changed system of representation of the information.

\* \* \* \* \*